US008387656B2

(12) United States Patent
Davies et al.

(10) Patent No.: US 8,387,656 B2
(45) Date of Patent: Mar. 5, 2013

(54) PRESSURE MONITORING DEVICE FOR A PAINT SPRAY GUN

(76) Inventors: Simon Davies, Dorset (GB); Paul Lawrence Garlick, Bournemouth (GB); John Anthony Rogers, Dorset (GB)

( * ) Notice: Subject to any disclaimer, the term of this patent is extended or adjusted under 35 U.S.C. 154(b) by 1170 days.

(21) Appl. No.: 10/598,093

(22) PCT Filed: Feb. 17, 2005

(86) PCT No.: PCT/IB2005/000404
§ 371 (c)(1),
(2), (4) Date: Jun. 13, 2007

(87) PCT Pub. No.: WO2005/082544
PCT Pub. Date: Sep. 9, 2005

(65) Prior Publication Data

US 2008/0029615 A1 Feb. 7, 2008

(30) Foreign Application Priority Data

Feb. 19, 2004 (GB) .................................. 0403605.9
Jan. 25, 2005 (GB) .................................. 0501467.5

(51) Int. Cl.
*E03B 7/07* (2006.01)
*F16K 37/00* (2006.01)
*F16K 27/06* (2006.01)
*F16K 27/00* (2006.01)
*B05B 7/12* (2006.01)

(52) U.S. Cl. ........ 137/557; 137/229; 251/366; 251/367; 239/526

(58) Field of Classification Search .................. 137/557, 137/227, 229; 251/366, 367; 239/526, 290
See application file for complete search history.

(56) References Cited

U.S. PATENT DOCUMENTS (Continued)

FOREIGN PATENT DOCUMENTS

DE 29616690 U1 2/1998
EP 0247586 A2 12/1987

(Continued)

OTHER PUBLICATIONS

European Communication regarding Application No. 05 708 545.8-2425 dated Feb. 13, 2008.

(Continued)

*Primary Examiner* — Craig Schneider
*Assistant Examiner* — Atif Chaudry
(74) *Attorney, Agent, or Firm* — Lowe Hauptman Ham & Berner, LLP

(57) ABSTRACT

A pressure monitoring device in accordance with the present invention comprises a housing 1 within which are provided an air inlet 2 and an air outlet 3. Connecting the air inlet 2 and the air outlet 3 is an air passage way 4 which includes a pressure take off point 9. The air inlet 2 includes' a threaded bore section 2*a* into which is screwed a coupling device 7 for coupling with the air outlet of a compressed air supply. The air outlet 3 is also configured to receive a coupling device 8 for coupling with the air inlet of a paint spray gun. A digital pressure gauge 5 is housed in a top surface of the housing 1 as shown in the figures. The gauge samples air pressure at the pressure take off point 9 through conduit 9*a*. Screw threaded into a bore 11 in the housing is a needle valve 6 which can be adjusted by means of valve adjustment means 10*a*, 10*b* to move further towards or away from the pressure take off 9.

23 Claims, 6 Drawing Sheets

U.S. PATENT DOCUMENTS

| | | | | | |
|---|---|---|---|---|---|
| 1,102,730 | A | * | 7/1914 | Desmond | 137/227 |
| 1,652,051 | A | * | 12/1927 | Rogers | 137/505.41 |
| 2,310,558 | A | * | 2/1943 | Teeters et al. | 251/214 |
| 2,630,291 | A | * | 3/1953 | Gifford et al. | 251/223 |
| 2,718,373 | A | * | 9/1955 | Henry | 251/357 |
| 3,059,858 | A | * | 10/1962 | Linder | 239/416.1 |
| 3,259,144 | A | | 7/1966 | Taplin | |
| 3,835,876 | A | * | 9/1974 | Laakaniemi et al. | 137/82 |
| 4,060,984 | A | * | 12/1977 | Paddock | 60/290 |
| 5,152,318 | A | | 10/1992 | Ortner et al. | |
| 5,282,493 | A | * | 2/1994 | Schwartz et al. | 137/613 |
| 5,485,857 | A | * | 1/1996 | Amundsen | 134/102.2 |
| 5,713,519 | A | | 2/1998 | Sandison et al. | |
| 5,925,826 | A | | 7/1999 | Kodama et al. | |
| 6,585,173 | B2 | | 7/2003 | Schmon et al. | |
| 6,915,705 | B1 | * | 7/2005 | Truitt et al. | 73/861.52 |
| 2003/0116734 | A1 | | 6/2003 | Casar et al. | |
| 2003/0230636 | A1 | * | 12/2003 | Rogers | 239/71 |

FOREIGN PATENT DOCUMENTS

| | | | |
|---|---|---|---|
| EP | 0414145 | A2 | 2/1991 |
| EP | 526525 | A1 | 10/1991 |
| EP | 1247586 | A | 10/2002 |
| FR | 836968 | A | 1/1939 |
| FR | 960437 | A | 4/1950 |
| GB | 2239529 | A1 | 7/1991 |
| WO | 0104718 | A1 | 1/2001 |

OTHER PUBLICATIONS

"Air Tools" Internet Article, Jan. 24, 2006 http://www.chpower.com/printedcatalog/200403/Accessories%201_03. pdf.

* cited by examiner

PRESSURE MONITORING DEVICE FOR A PAINT SPRAY GUN

RELATED APPLICATIONS

The present application is a National Phase entry of International Application Number PCT/IB2005/000404, filed Feb. 17, 2005, which claims priority from, British Application Numbers 0403605.9 filed Feb. 19, 2004 and 0501467.5 filed Jan. 25, 2005, the disclosures of which are hereby incorporated by reference herein in their entirety.

TECHNICAL FIELD

This invention relates to pressure gauges, more particularly, to pressure gauges used to monitor the flow of gas in a gas powered, hand held instrument such as a paint spray gun.

BACKGROUND

Paint spray guns are well know in which gas under pressure is used to atomise fluid (such as paint) through a nozzle of the gun to form a spray. Typically, the gas under pressure is air from a compressed air supply. Such guns are generally provided with an air flow valve adjacent the air inlet of the gun which can be adjusted to control the airflow into the gun. Paint is supplied to the gun through a separate inlet and its flow rate can also be adjusted by means of a fluid flow valve. The nozzle is located in a spray head which comprises the nozzle and an air cap positioned around the nozzle. A spreader valve associated with the air cap is operable to adjust air flow to outlets in a pair of horns provided on the air cap. Air meeting the paint at the spray head atomises the paint to produce a spray which is released from the gun via the nozzle. The spread, shape and size of atomised plume leaving the gun can be adjusted by adjusting the spreader valve, changes in air pressure at the air cap result in adjustment of the area covered by a spray released from the gun.

In order that various air flows and pressures within the gun can be monitored and controlled, paint guns are often provided with pressure gauges. These pressure gauges come in analogue and digital form, they may be attachable to the gun at or adjacent an air or fluid inlet or may be incorporated into the main body of the gun. Examples of some prior art pressure gauge arrangements are summarised below.

In EP 526 525 a miniature digital electronic air pressure gauge is threaded into a threaded bore provided in the body of a compressed air spray gun. Internally of the gun, the air pressure gauge is arranged to be in communication with a passage which leads to a region downstream of both the air flow valve and a trigger operated air on/off valve.

The ITW OMX-610 spray gun has a similar threaded bore which receives an analogue pressure gauge. In this spray gun, the gauge communicates with a region downstream of the air flow valve but upstream of the trigger operated air on/off valve.

U.S. Pat. No. 6,585,173 B2 discloses a pressure gauge which is integrated into the handle of a paint spray gun.

The inventors' co-pending patent application EP 03252727.7 discloses a pressure gauge which is retro-fittable to a spray gun by mounting on an adapted valve bushing of a spreader valve or fluid flow valve.

Experience has shown that retro fittable gauges are not best suited to monitor the air pressure to the gun as they cannot be optimally positioned with respect to the air inlet and air flow valve. The introduction of a thread by means of which the gauge is typically attached can itself disrupt the air flow in the region where the measurement is taken. Furthermore, the addition of an awkwardly shaped or sized gauge to a gun can imbalance the gun and interfere with the user's normal operation of the gun.

Whilst there is more flexibility in positioning of integrated gauges, these gauges have historically been designed into existing gun designs. Integrated designs must address ergonomics as well as technical requirements and the result is often a compromise of the two. Consequently the adapted designs may not be the most ergonomic or have the most optimally positioned take off point for the gauge. In addition, such guns are inherently more expensive than existing guns to which gauges can be retrofitted. Furthermore, integrated arrangements are expensive and complex to repair should the gauge become damaged. In some circumstances, the entire gun may need to be replaced.

Manufacturers of paint and/or paint spray guns recommend standard pressures for air at the air inlet of a gun to achieve a desired paint finish or colour match, thus it is desirable to be able to accurately monitor and control pressure of air entering the air inlet. From a technical perspective, it is desirable to have the pressure take off point close to or directly downstream of the air flow valve, this has not been achieved with prior art arrangements as such positioning of a gauge with respect to air flow valves of existing guns is contrary to ergonomics.

When an airflow valve is used to reduce a high inlet pressure to a low output pressure, the position of the valve head produces a high pressure drop which causes a relatively high speed air jet. Air velocity can vary from 20 $ms^{-1}$ to more than 332 $ms^{-1}$ depending on the position of the valve. Air flowing past a pressure gauge at high speeds can influence the pressure gauge's reading. The pressure reading recorded will be lower than the actual pressure. This will make it difficult to accurately control the pressure of the air entering the air inlet.

SUMMARY

The present invention aims to provide a pressure monitoring device for a paint spray gun which at least in part alleviates problems recognised in prior art arrangements.

In accordance with the present invention there is provided a pressure monitoring device for a paint spray gun the pressure monitoring device comprising;

a housing having an air inlet, an air outlet and an air passage connecting the inlet and the outlet;

means for coupling the air inlet with an outlet of a compressed air supply and means for coupling the air outlet with an air inlet of a paint spray gun;

a digital pressure gauge housed in the housing and positioned to monitor pressure at a pressure take off point in the air passage;

a valve housed in the housing and operable to adjust air flow in the air passage;

valve adjustment means associated with the valve and accessible externally of the housing; wherein the air inlet, air outlet and air passage are shaped and the valve is positioned so as to provide minimal turbulence of air flow and minimal pressure drop through the device and the pressure take off point is downstream of the valve.

Conveniently, the inlet and the outlet are arranged substantially in line with each other. Such an arrangement allows the housing to be compact and of uniform shape.

The air inlet and outlet may comprise a pair of cavities, each cavity having a substantially circular cross sectioned portion adjacent the entry of the air inlet and exit of the air outlet and a substantially segmental cross sectioned portion adjacent the pressure take off point and passing through a plane which includes the valve seat, the substantially circular and segmental cross-sectioned portions being separated by a tapered section tapering from the circumference of the circular cross sectioned portion to the chord of the segmental cross sectioned portion. The cavities are desirably arranged on either side of a longitudinal axis of the housing with the chords in substantially parallel alignment.

The air passage is conveniently provided in the form of a bore which passes through the two segmental sections. Desirably the air passage bore has an axis which is substantially orthogonal to the longitudinal axis of the housing. The tapered sections of the two cavities may be at the same angle or at different angles.

One or both of the segmental cross-sectioned portions may terminate in a taper extending from the chord to the arc of the segment, desirably such that the chord surface of the segmental cross sectioned portion is longer than the arched surface. In such embodiments, the pressure take off point is desirably situated in the taper.

In one embodiment, the air inlet and air outlet comprise a pair of cavities of substantially the same size and shape, each cavity having a substantially circular cross sectioned portion adjacent the entry of the air inlet and exit of the air outlet and a substantially segmental cross sectioned portion adjacent the pressure take off point and passing through a plane which includes the pressure take off point, the substantially circular and segmental cross-sectioned portions being separated by a tapered section tapering from the circumference of the circular cross sectioned portion to the chord of the segmental cross sectioned portion.

The tapers are desirably at an angle of from about 30° to about 80° with respect to the common axis (or longitudinal axis of the housing), more desirably between about 55° and 80° and preferably between about 60° and 70°.

The air passage is conveniently formed by provision of a bore having a central axis aligned orthogonally with respect to both the common axis of the air inlet and air outlet and the chords of the segmental cross sectioned portions, and the valve seat is located in the bore.

Desirably, the digital gauge has a human readable display visible at a surface of the housing. Preferably, the gauge display and valve adjustment means are arranged in line with each other on opposing surfaces of the housing and in a plane substantially orthogonal to the plane which contains the air inlet and air outlet. This configuration is desirable for aesthetic and ergonomic reasons. It is to be understood that other configurations would still perform the desired technical effect and are not intended to be excluded from the scope of the appended claims.

The housing, including the air inlet and air outlet is conveniently die cast or injection moulded. Optionally, the housing is die cast from zinc allowing the device to be cleaned using conventional paint gun cleaning techniques. Desirably, the housing is engineered to have an IP66 casing integrity, i.e high resistance to ingress of dust and fluid. Such a housing would permit the device to be cleaned with a paint spray gun in a conventional gun wash machine.

The valve is conveniently a needle valve and the valve adjustment means a screw threaded knob. Desirably the thread of the knob is selected to allow very fine adjustment of the air flow, increments of adjustment being at least comparable to the resolution of the pressure gauge.

The inventors have found that by providing a retro fittable pressure monitoring device fittable between an air supply and the air inlet of a paint spray gun and incorporating an air flow valve within the device, many advantages are gained over conventional arrangements.

As the valve, gauge, air outlet and inlet and an air passage are all incorporated in the device, each can be engineered and positioned to ensure that the pressure take off point is positioned in a region where there is minimal turbulence of air flowing through the air passage. With the pressure take off point located close to and downstream of the air flow valve, it is possible to obtain very accurate measurements of pressure of air entering the gun inlet.

It will be appreciated that the air flow direction through the device can be reversed.

The integrated device is more compact and lightweight than conventional “add-on” arrangements yet can conveniently be retro fitted to existing guns. The devices are easily replaceable in the event they are damaged without the need to tamper with or replace the gun.

It will be appreciated that various coupling means may be used to couple the air inlet and air outlet of the device respectively to a compressed air supply and air inlet of a paint spray gun, the coupling means can be selected from known coupling devices specifically for a given gun and air supply combination. The device is highly adaptable and retro fittable to a wide variety of paint gun designs.

It will be appreciated that the inclusion of an air flow valve in the device renders redundant the air flow valve conventionally provided on a paint spray gun, such valves could, in future be omitted from newly manufactured guns thereby reducing the costs of manufacture of the gun.

BRIEF DESCRIPTION OF THE DRAWINGS

For the purposes of exemplifications, an embodiment of the invention will now be further described with reference to the following figures in which.

DETAILED DESCRIPTION OF THE EMBODIMENTS

Figure 1:
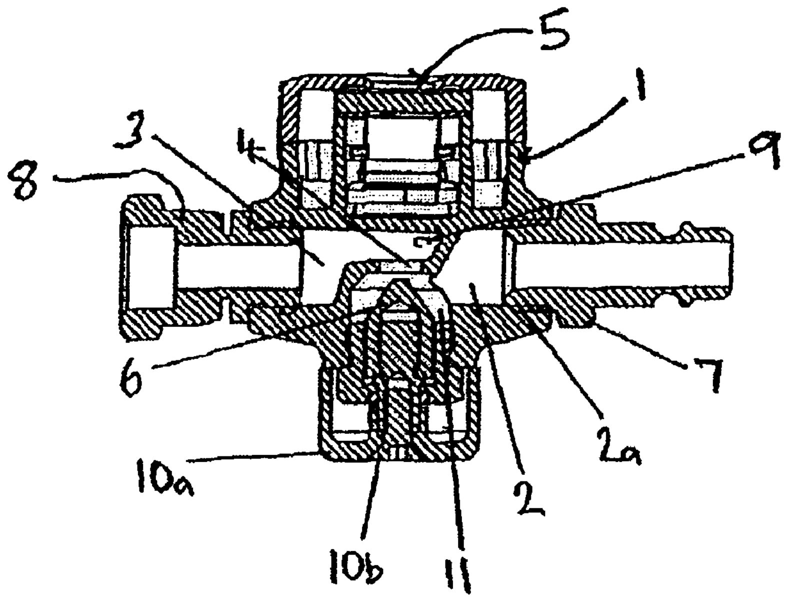
FIG. 1 shows a longitudinal cross section through an embodiment of a pressure monitoring device in accordance with the invention.
Figure 2:
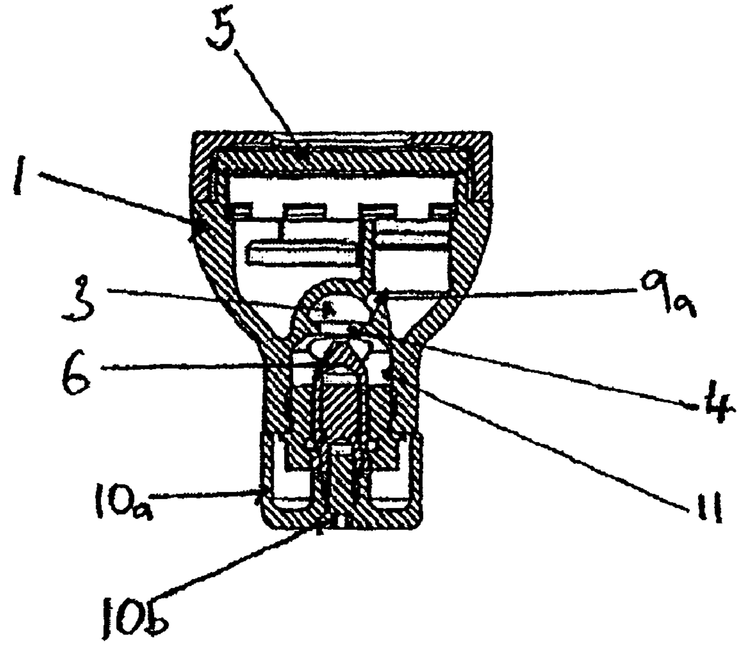
FIG. 2 shows a transverse cross section through the embodiment of FIG. 1.
Figure 3A:
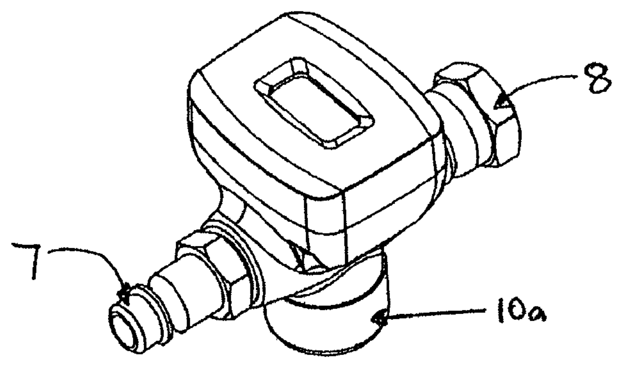
FIGS. 3*a*-3*d* show in various views the embodiment of FIGS. 1 and 2.
Figure 3B:
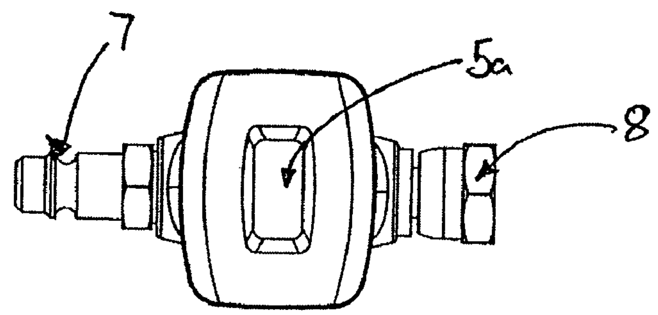
Figure 3C:
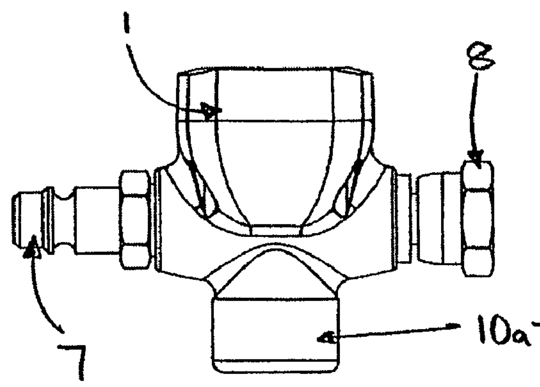
Figure 3D:
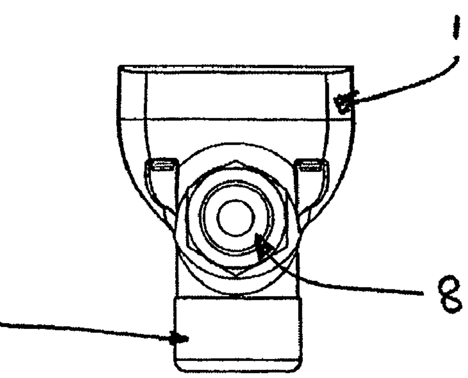
Figure 4A:
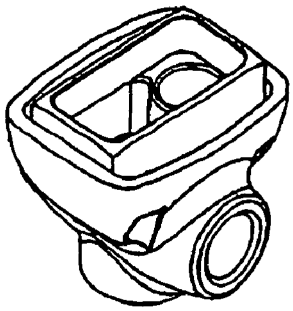
FIGS. 4*a*-4*g* show in more detail views of the housing of the embodiment of FIGS. 1 to 3.
Figure 4B:
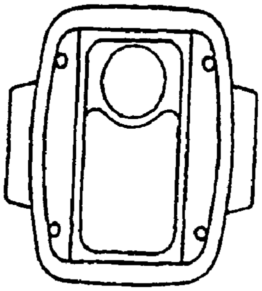
Figure 4C:
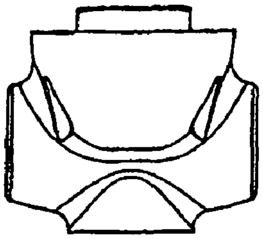
Figure 4D:
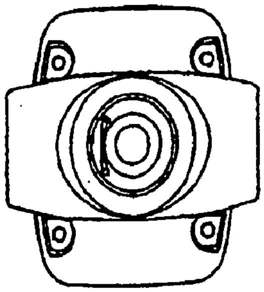
Figure 4E:
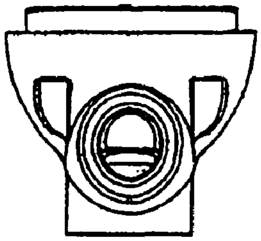
Figure 4F:
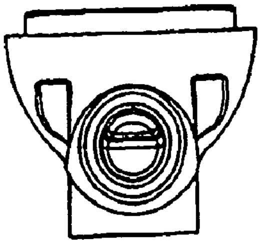
Figure 4G:
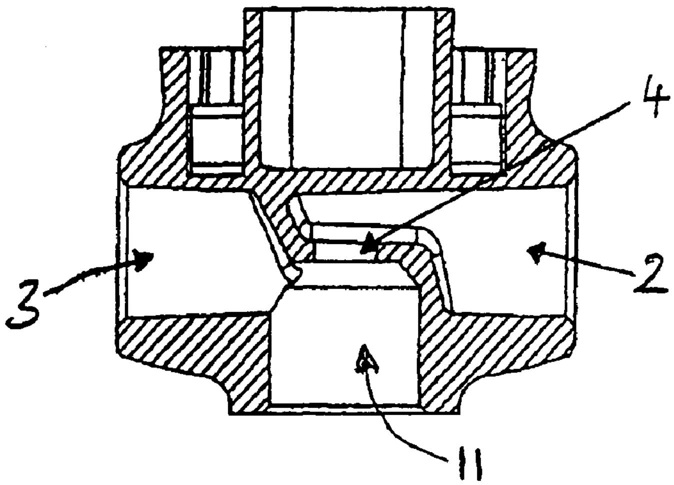

As can be seen from FIGS. 1 and 2, a pressure monitoring device in accordance with the present invention comprises a housing 1 within which are provided an air inlet 2 and an air outlet 3. Connecting the air inlet 2 and the air outlet 3 is an air passageway 4 which includes a pressure take off point 9. The air inlet 2 includes a threaded bore section 2*a* into which is screwed a coupling device 7 for coupling with the air outlet of a compressed air supply. The air outlet 3 is also configured to receive a coupling device 8 for coupling with the air inlet of a paint spray gun. As is clear from FIG. 1 an end of the air outlet cavity terminates in a taper extending from the chord to the arc of the segment of the cavity. The pressure take off point 9 is located in the tapered end portion of the air outlet A digital pressure gauge 5 is housed in a top surface of the housing 1 as shown in the figures. The gauge samples air pressure at the pressure take off point 9 through conduit 9*a.*

Screw threaded into a bore 11 in the housing is a needle valve 6 which can be adjusted by means of valve adjustment means 10*a*, 10*b* to move further towards or away from the pressure take off 9. The operation of the valve adjustment means is discussed in more detail in relation to FIG. 5.

FIG. 3 shows various views of the device illustrated in FIGS. 1 and 2. FIG. 3*a* shows an isometric view. FIG. 3*b* shows a plan view of the device with the gauge 5 present. It can be seen that the gauge includes a display 5*a* visible through a window in the housing 1. FIG. 3*c* illustrates a front view of the device and FIG. 3*d* illustrates a right end view.

FIG. 4 illustrates in various views the housing with the couplings 7, 8, gauge 5, valve 6 and valve adjusting means 10*a*, 10*b* removed. FIG. 4*a* shows an isometric view of the housing, FIG. 4*b* a plan view, FIG. 4*c* a front view, FIG. 4*d* a bottom view, FIG. 4*e* a left end view and FIG. 4*f* a right end view. FIG. 4*g* illustrates the view of FIG. 4*c* in cross section.

Figure 5:
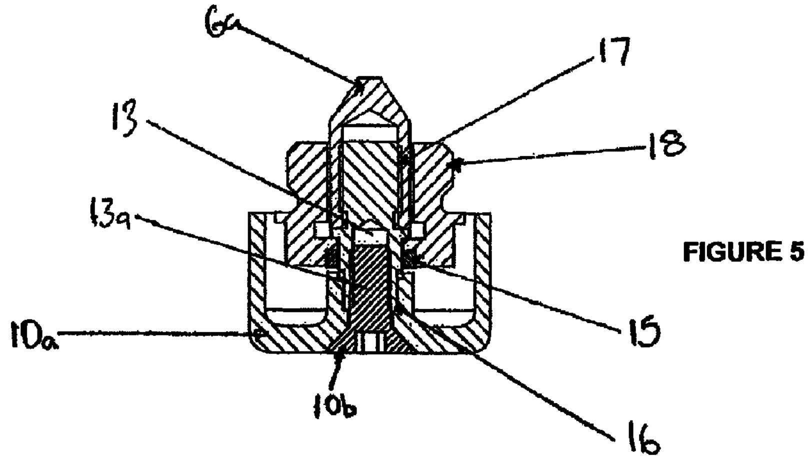
FIG. 5 shows in more detail, the valve and valve adjusting means of the embodiment of FIGS. 1 to 4.

FIG. 5 shows in more detail the valve 6 and valve adjustment means 10*a*, 10*b*. The arrangement comprises a main valve body 18 which carries a threaded member 14 having an external, left hand thread 17 onto which is screwed a valve closure member 6*a*. At an opposing end of the threaded member 14, the threaded member is provided with a bore 13 having an internal screw thread 13*a* into which is screwed an adjustment screw 10*b*. which secures adjustable knob 10*a* to the threaded member 14 and main valve body 18. an O-ring 15 seals the valve. As can be seen in FIG. 1, the assembled valve 6 and valve adjustment means 10*a*, 10*b* can be screwed into a bore 11 of the housing 1 by means of complementary screw threads provided in the bore and on the main valve body 18.

It will be appreciated that turning of knob 10*a* will cause turning of screw 10*b* which in turn will travel along the screw thread 13*a* of the threaded member 14 causing the valve closure member 6*a* to extend from or be withdrawn into (depending on the direction in which the knob 10*a* is turned) the main valve body 18.

Figure 6:
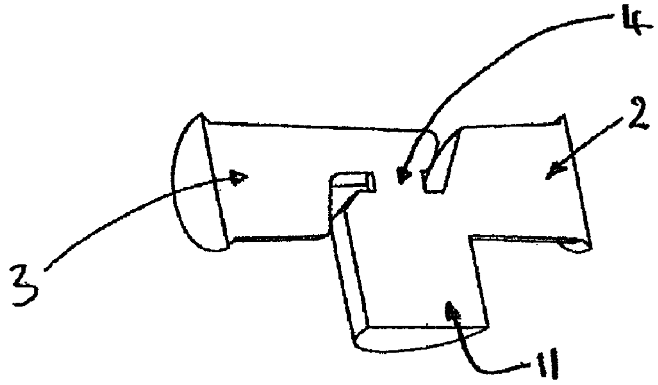
FIG. 6 shows in isometric projection the shape of the combined air inlet, air outlet and air passage of the embodiment of the invention, in longitudinal cross section.
Figure 7:
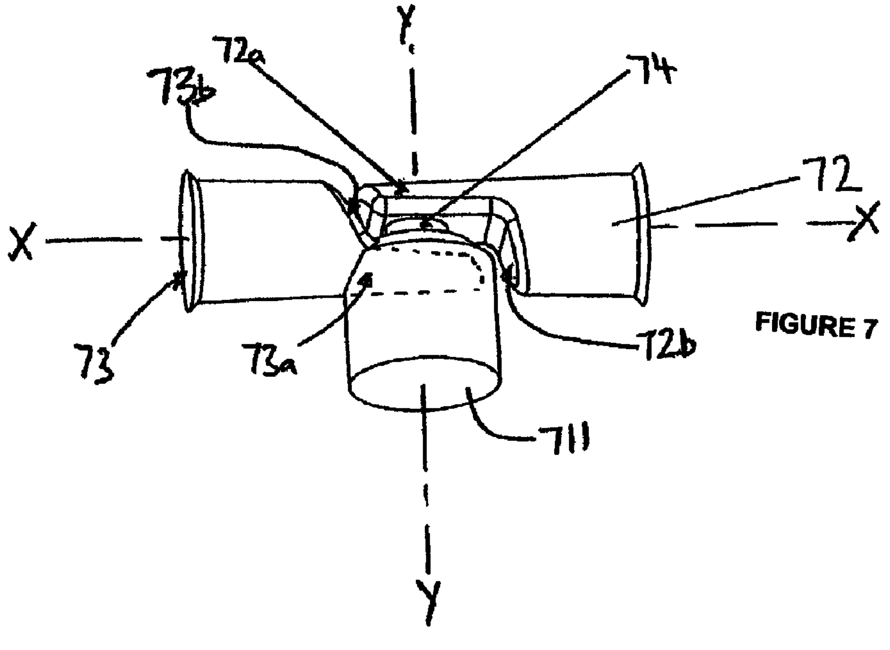
FIG. 7 illustrates how the shape of FIG. 6 may be formed from a die cast or injection moulded air inlet and outlet and a later added bore.

FIG. 6 shows generally the shape of the space defined by the air inlet 2, air outlet 3, connecting air passage 4 and bore 11 within the housing 1. FIG. 7 shows how the shape can be formed from a pair of cavities 72, 73 of substantially the same size and shape, each cavity having a substantially circular cross sectioned portion adjacent the entry of the air inlet and exit of the air outlet and a substantially segmental cross sectioned portion 72*a*, 73*a* adjacent to the pressure take off point and passing through a plane which includes the pressure take off point, the substantially circular and segmental cross-sectioned portions being separated by a tapered section 72*b*, 73*b* tapering from the circumference of the circular cross sectioned portion to the chord of the segmental cross sectioned portion.

As illustrated, the air passage is formed by the introduction of a bore 74 (which extends from bore 711) having a central axis Y aligned orthogonally with respect to both the common axis X of the air inlet and air outlet and the chords of the segmental cross sectioned portions.

It will be appreciated that the general shape of the air inlet, outlet and connecting passage may have applications in other gas flow devices, for example but not strictly limited to pneumatic component valves. In another aspect, therefore, the invention comprises a gas flow passage comprising a pair of cavities of substantially the same size and shape, each cavity having a substantially circular cross sectioned portion adjacent the points of entry and exit to the passage and a substantially segmental cross sectioned portion, the substantially circular and segmental cross-sectioned portions being separated by a tapered section tapering from the circumference of the circular cross sectioned portion to the chord of the segmental cross sectioned portion, the pair of cavities being connected by a bore having a central axis aligned orthogonally with respect to both the common axis of the two cavities and the chords of the segmental cross sectioned portions.

The taper is desirably at an angle of from about 30° to about 80° with respect to the common axis, more desirably between about 55° and 80°. In a preferred embodiment, the angle of the taper of the inlet is about 60° and that of the outlet is about 75°.

Figure 8:
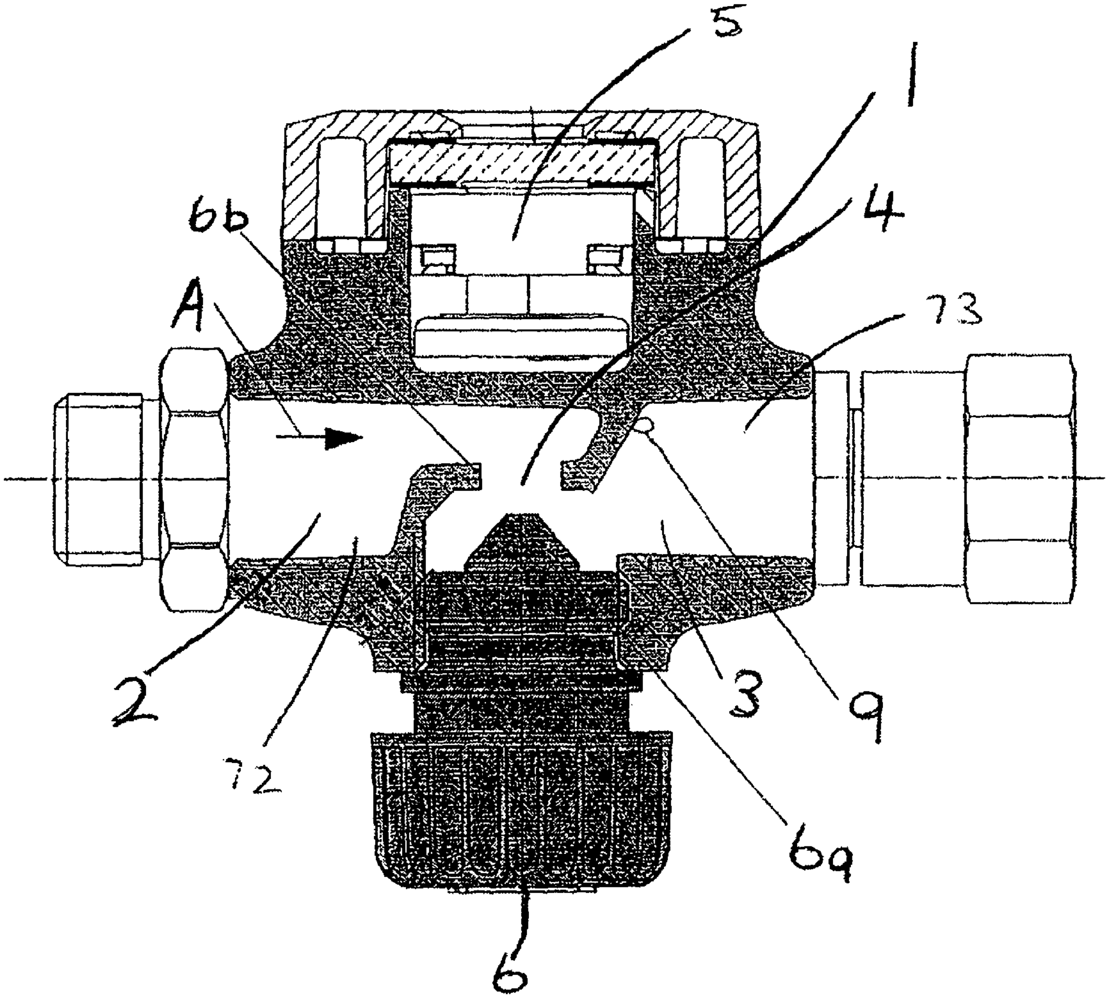
FIG. 8 shows a longitudinal cross section through an alternative embodiment of a pressure monitoring device wherein the direction of air flow is reversed.

In an alternative embodiment the air flow direction through the valve is reversed. As shown in FIG. 8, the air flows in direction A from air inlet 2 to air outlet 3. Air passageway 4 includes an alternative pressure take off point 9 at which the gauge samples air pressure. The shape of the pair of cavities 72, 73 forming the shape of the air passageway 4 is the same as in previously described embodiments but the air flow direction is reversed.

The reversal of air flow direction enables an accurate pressure reading to be taken even when the valve closure member 6*a* is screwed to a position close to the valve seat 6*b*. This arrangement leaves only a very small annulus in air passageway 4 and produces a high pressure drop from the air inlet 2 to the air outlet 3. The pressure take off point 9 is located in a cavity downstream of the valve, where the high pressure drop does not affect the pressure of the air sampled. As in previous embodiments, a digital pressure gauge 5 is housed in a top surface of the housing 1 as shown in FIG. 8.

Figure 9:
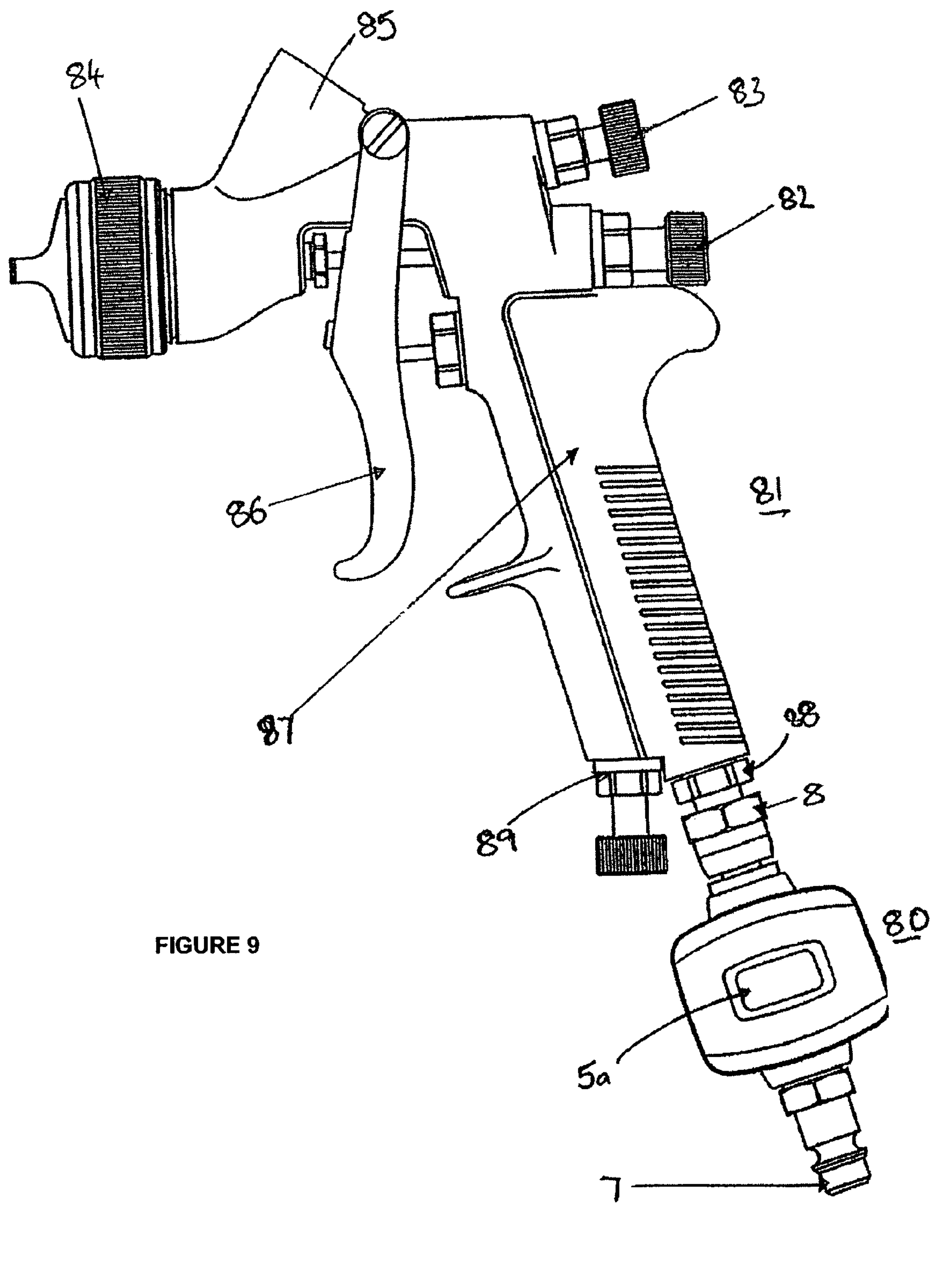
FIG. 9 shows generally a paint spray gun retro fitted with the embodiment of FIGS. 1 to 4.

As is shown in FIG. 9, a paint spray gun 81 generally comprises a gun body 87 having a trigger 86 mounted thereon. At the top end of the gun is an air cap 84 which surrounds a nozzle (not shown) through which atomised paint is delivered. Air flow to the nozzle 84 can be adjusted by means of spreader valve 83. Near to the nozzle is a paint inlet port 85 to which a supply of paint (not shown) can be connected. Situated just below the spreader valve 83 is a fluid flow valve 82 which can be adjusted to control the flow rate of paint being delivered to the gun 81. Supply of fluid to the gun 81 is generally controlled by operation of the trigger 86. At the bottom of the gun 81 is an air inlet port 88 and adjacent to the air inlet port 88 is an air flow valve 89 operable to adjust the flow rate of air entering the inlet port 88. Connected to the air inlet port 88 by means of coupling 8 is a pressure monitoring device 80 as previously described. It will be appreciated that with the pressure monitoring device 80 in place, the air flow valve 89 becomes redundant, as air flow can be adjusted by means of the valve 6 embodied and valve adjustment means 10*a*, 10*b* embodied in the pressure monitoring device It is to be understood that the foregoing is merely exemplary of just one embodiment of the invention, others of which will readily occur to the skilled addressee without departing from the scope of the invention as defined by the appended claims. The illustrations and specific description are not intended strictly to limit the scope of the invention as claimed.

The invention claimed is:

1. A pressure monitoring device for a paint spray gun, the pressure monitoring device comprising;

a housing having an air inlet, an air outlet and an air passage connecting the inlet and the outlet;

means for coupling the air inlet with an outlet of a compressed air supply and means for coupling the air outlet with an air inlet of the paint spray gun;

a digital pressure gauge housed in the housing and positioned to monitor pressure at a pressure take off point in the air passage;

a valve housed in the housing and operable to adjust air flow in the air passage; and valve adjustment means for adjusting an opening of the valve and accessible externally of the housing;

wherein the air inlet, air outlet and air passage are shaped and the valve is positioned so as to provide minimal turbulence of air flow and minimal pressure drop through the device;

the air inlet and outlet comprise inlet and outlet cavities, respectively, each said cavity having a substantially circular cross-sectioned portion adjacent an entry of the air inlet or an exit of the air outlet, respectively, a substantially segmental cross-sectioned portion passing through a first plane which includes a valve seat of the valve, and a tapered section separating the substantially circular and segmental cross-sectioned portions, said tapered section tapering from the circumference of the circular cross-sectioned portion to the chord of the segmental cross-sectioned portion;

the pressure take off point is positioned in the outlet cavity, downstream of the valve seat, in a region where there is minimal turbulence of air flowing through the air passage, and outside a second plane that is perpendicular to a longitudinal axis of the housing and contains an axis of the valve;

the segmental cross-sectioned portion of the inlet cavity terminates in a taper extending from the chord to the arc of the segmental cross-sectioned portion; and the pressure take off point is situated either (i) facing the exit of the air outlet across said second plane, or (ii) separated, in a direction parallel to the longitudinal axis of the housing, from the entry of the air inlet by said taper of the segmental cross-sectioned portion of the inlet cavity.

2. A pressure monitoring device as claimed in claim 1, wherein the air inlet and air outlet are arranged in line with each other.

3. A pressure monitoring device as claimed in claim 1, wherein the cavities are arranged on opposite sides of the longitudinal axis of the housing with the chords of the segmental cross-sectioned portions in substantially parallel alignment.

4. A pressure monitoring device as claimed in claim 3, wherein the air passage is a bore which passes through the two segmental cross-sectioned portions.

5. A pressure monitoring device as claimed in claim 4, wherein the bore has an axis which is substantially orthogonal to the longitudinal axis of the housing.

6. A pressure monitoring device as claimed in claim 1, wherein the tapered sections of the two cavities are at the same angle with respect to the first plane which includes the valve seat.

7. A pressure monitoring device as claimed in claim 1, wherein the tapered sections of the two cavities are at different angles with respect to the first plane which includes the valve seat.

8. A pressure monitoring device as claimed in claim 1, wherein the cavities are of substantially the same size and shape.

9. A pressure monitoring device as claimed in claim 1, wherein the chord surface of said at least one of the segmental cross-sectioned portions is longer than the arced surface.

10. A pressure monitoring device as claimed in claim 1, wherein the taper is at an angle of from about 30° to about 80° with respect to the first plane which includes the valve seat.

11. A pressure monitoring device as claimed in claim 1, wherein the taper is at an angle of between 55° and 80° with respect to the first plane which includes the valve seat.

12. A pressure monitoring device as claimed in claim 1, wherein the taper of the segmental cross-sectioned portion of the inlet cavity is at an angle of 60° with respect to the first plane which includes the valve seat; and the segmental cross-sectioned portion of the outlet cavity terminates in a further taper extending from the chord to the arc of the segmental cross-sectioned portion at an angle of 75° with respect to the first plane which includes the valve seat.

13. A pressure monitoring device as claimed in claim 1, wherein the digital gauge has a human readable display visible at a surface of the housing.

14. A pressure monitoring device as claimed in claim 13, wherein the gauge display and valve adjustment means are arranged in line with each other along the axis of the valve and on opposing surfaces of the housing.

15. A pressure monitoring device as claimed in claim 1, wherein the housing, including the air inlet and air outlet, is selected from the group consisting of a die cast housing, an injection moulded housing, and a zinc die cast housing.

16. A pressure monitoring device as claimed in claim 1, wherein the housing has an IP66 casing integrity.

17. A pressure monitoring device as claimed in claim 1, wherein the valve is a needle valve and the valve adjustment means comprise a screw threaded knob.

18. A pressure monitoring device as claimed in claim 17, wherein the thread of the knob is configured to allow increments of adjustment of the air flow being at least comparable to the resolution of the pressure gauge.

19. A paint spray gun, comprising:

a gun body, a trigger mounted on the gun body, a nozzle which is at a front end of the gun body and through which atomised paint is sprayed, a spreader valve at a rear end of the gun body for adjusting air flow to the nozzle, a fluid flow valve at the rear end of the gun body for adjusting a flow rate of paint delivered to the nozzle, an air inlet port at a bottom of the gun body, and a pressure monitoring device, comprising;

a housing having an air inlet, an air outlet and an air passage connecting the inlet and the outlet;

means for coupling the air inlet with an outlet of a compressed air supply and means for coupling the air outlet with an air inlet of the paint spray gun;

a digital pressure gauge housed in the housing and positioned to monitor pressure at a pressure take off point in the air passage;

a valve housed in the housing and operable to adjust air flow in the air passage; and valve adjustment means for adjusting an opening of the valve and accessible externally of the housing;

wherein the air inlet, air outlet and air passage are shaped and the valve is positioned so as to provide minimal turbulence of air flow and minimal pressure drop through the device;

the air inlet and outlet comprise a pair of cavities, each cavity having a substantially circular cross-sectioned portion adjacent an entry of the air inlet or an exit of the air outlet, respectively, a substantially segmental cross-sectioned portion adjacent the pressure take off point and passing through a plane which includes a valve seat of the valve, and a tapered section separating the substantially circular and segmental cross-sectioned portions, said tapered section tapering from the circumference of the circular cross-sectioned portion to the chord of the segmental cross-sectioned portion;

the pressure take off point is positioned downstream of the valve in a region where there is minimal turbulence of air flowing through the air passage; and the air inlet of said pressure monitoring device is connectable to the compressed air supply and the air outlet of said pressure monitoring device is coupled to the air inlet port of the gun body for monitoring and adjusting a flow rate of air entering the air inlet port from the compressed air supply.

20. A pressure monitoring device for a paint spray gun, the pressure monitoring device comprising;

a housing having an air inlet, an air outlet and an air passage connecting the inlet and the outlet;

a pressure gauge housed in the housing and positioned to monitor pressure at a pressure take off point in the air passage;

a valve housed in the housing and operable to adjust air flow in the air passage; and a valve adjustment element for adjusting an opening of the valve and accessible externally of the housing;

wherein the air inlet and outlet comprise inlet and outlet cavities, respectively, each said cavity having a substantially circular cross-sectioned portion adjacent an entry of the air inlet or an exit of the air outlet, respectively, a substantially segmental cross-sectioned portion, and a tapered section connecting the substantially circular and segmental cross-sectioned portions, said tapered section tapering from the circumference of the circular cross-sectioned portion to the chord of the segmental cross-sectioned portion;

the segmental cross-sectioned portion of the inlet cavity terminates in a taper extending from the chord to the arc of the segmental cross-sectioned portion;

the pressure take off point is positioned in the outlet cavity, downstream of the valve, and outside a plane that is perpendicular to a longitudinal axis of the housing and contains an axis of the valve; and the pressure take off point is positioned either (i) facing the exit of the air outlet across said plane, or (ii) separated, in a direction parallel to the longitudinal axis of the housing, from the entry of the air inlet by said taper of the segmental cross-sectioned portion of the inlet cavity.

21. A pressure monitoring device as claimed in claim 20, wherein the pressure take off point is positioned facing the exit of the air outlet across said plane.

22. A pressure monitoring device as claimed in claim 20, wherein the pressure take off point is separated, in the direction parallel to the longitudinal axis of the housing, from the entry of the air inlet by said taper of the segmental cross-sectioned portion of the inlet cavity.

23. A paint spray gun, comprising:

a gun body, a trigger mounted on the gun body, a nozzle which is at a front end of the gun body and through which atomised paint is sprayed, a spreader valve at a rear end of the gun body for adjusting air flow to the nozzle, a fluid flow valve at the rear end of the gun body for adjusting a flow rate of paint delivered to the nozzle, an air inlet port at a bottom of the gun body, and a pressure monitoring device as claimed in claim 20, wherein the air inlet of said pressure monitoring device is connectable to the compressed air supply and the air outlet of said pressure monitoring device is coupled to the air inlet port of the gun body for monitoring and adjusting a flow rate of air entering the air inlet port from the compressed air supply.

* * * * *